(12) United States Patent
Hu et al.

(10) Patent No.: US 10,935,809 B2
(45) Date of Patent: Mar. 2, 2021

(54) LENS DRIVING MECHANISM AND METHOD FOR CONTROLLING THE SAME

(71) Applicant: TDK TAIWAN CORP., Taoyuan (TW)

(72) Inventors: Chao-Chang Hu, Taoyuan (TW); Chen-Hsien Fan, Taoyuan (TW); Yi-Liang Chan, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 10 days.

(21) Appl. No.: 16/416,639

(22) Filed: May 20, 2019

(65) Prior Publication Data

US 2019/0271855 A1 Sep. 5, 2019

Related U.S. Application Data

(63) Continuation of application No. 15/463,616, filed on Mar. 20, 2017, now Pat. No. 10,338,403.

(Continued)

(30) Foreign Application Priority Data

Jan. 25, 2017 (TW) ................................ 10610285.4

(51) Int. Cl.
*G02B 27/64* (2006.01)
(52) U.S. Cl.
CPC .................................. *G02B 27/646* (2013.01)
(58) Field of Classification Search
CPC .... G02B 27/646; G02B 13/001; G02B 7/005; G02B 7/09; G02B 7/02; G03B 5/00;
(Continued)

(56) References Cited

U.S. PATENT DOCUMENTS 6,157,779 A * 12/2000 Kosaka ................ G02B 27/646
359/557
9,386,200 B2 * 7/2016 Hongo ................. H04N 5/2253
(Continued)

FOREIGN PATENT DOCUMENTS

CN 103576414 A 2/2014
CN 204856000 U 12/2015
(Continued)

OTHER PUBLICATIONS

Office Action dated Aug. 16, 2019 in CN Application No. 201710134579.4.
(Continued)

*Primary Examiner* — Chiawei Chen
(74) *Attorney, Agent, or Firm* — Muncy, Geissler, Olds & Lowe, P.C.

(57) ABSTRACT

A lens driving mechanism is provided. The lens driving mechanism is configured to drive an optical lens, including a holder, a base, a first elastic element, and a first biasing element. The optical lens is disposed in a receiving space of the holder. The base has a central axis, and the holder is movable relative to the base. The first elastic element is connected to the holder and the base. The first biasing element exerts a force on the holder so that an optical axis of the optical lens has an angular displacement relative to the central axis.

18 Claims, 10 Drawing Sheets

Related U.S. Application Data

(60) Provisional application No. 62/316,845, filed on Apr. 1, 2016.

(58) Field of Classification Search
CPC .... G03B 2205/0007; G03B 2205/0015; G03B 2205/00; G03B 2205/0023; G03B 2205/0084; G03B 2205/0061; G03B 2205/0053; G03B 2205/0069; G03B 2205/0076; H04N 5/2253; H04N 5/2254; H04N 5/2257; H04N 5/23258; H04N 5/23287; H04N 5/2252; H04N 5/23212; H04N 5/2251; H04N 5/2328; H02K 41/0356
See application file for complete search history.

(56) References Cited

U.S. PATENT DOCUMENTS

| | | | | |
|---|---|---|---|---|
| 2006/0181632 A1* | 8/2006 | Makii | G02B 7/02 | 348/335 |
| 2007/0279497 A1* | 12/2007 | Wada | H04N 5/2257 | 348/208.7 |
| 2009/0103194 A1* | 4/2009 | Chen | F03G 7/065 | 359/823 |
| 2010/0074607 A1* | 3/2010 | Topliss | G02B 7/08 | 396/133 |
| 2011/0013063 A1* | 1/2011 | Yamamoto | H04N 5/2257 | 348/294 |
| 2011/0030368 A1* | 2/2011 | Kume | H04N 5/2254 | 60/527 |
| 2011/0096421 A1* | 4/2011 | Hirata | F03G 7/065 | 359/823 |
| 2011/0235194 A1* | 9/2011 | Nobe | G02B 7/08 | 359/823 |
| 2012/0174574 A1* | 7/2012 | Kotanagi | H02K 41/0356 | 60/528 |
| 2012/0314308 A1* | 12/2012 | Ikushima | G02B 27/646 | 359/814 |
| 2013/0162896 A1* | 6/2013 | Kang | G03B 5/00 | 348/374 |
| 2015/0370086 A1* | 12/2015 | Hamada | G02B 7/04 | 359/557 |
| 2016/0330375 A1* | 11/2016 | Sekimoto | G03B 5/00 | |
| 2017/0075192 A1* | 3/2017 | Brown | G03B 5/04 | |
| 2017/0171440 A1* | 6/2017 | Park | H04N 5/2254 | |
| 2018/0048799 A1* | 2/2018 | Bachar | G02B 7/06 | |
| 2019/0271855 A1* | 9/2019 | Hu | G02B 7/09 | |

FOREIGN PATENT DOCUMENTS

| | | |
|---|---|---|
| JP | 2007058075 A | 3/2007 |
| JP | 2015537247 A | 12/2015 |

OTHER PUBLICATIONS

Office Action issued in corresponding JP application No. 2017-064633 dated Sep. 29, 2020.

* cited by examiner

LENS DRIVING MECHANISM AND METHOD FOR CONTROLLING THE SAME

CROSS REFERENCE TO RELATED APPLICATIONS

This application is a Continuation of application Ser. No. 15/463,616, filed on Mar. 20, 2017, which claims the benefit of U.S. Provisional Patent Application No. 62/316,845, filed on Apr. 1, 2016, and Taiwan Patent Application No. 106102854 filed on Jan. 25, 2017, the entirety of which are incorporated by reference herein.

BACKGROUND OF THE INVENTION

Field of the Invention

The application relates in general to a lens driving mechanism, and in particular to a lens driving mechanism having a biasing element.

Description of the Related Art

Thanks to ongoing technological development, recent electronic devices (such as tablet computers and smartphones) usually include a lens module capable of aiding in photography or recording video. However, an image may come out blurry if the user shakes the lens module in the electronic device. To increase image quality, it is increasingly important to design a shockproof lens module.

BRIEF SUMMARY OF INVENTION

To address the deficiencies of conventional products, an embodiment of the invention provides a lens driving mechanism, configured to move an optical lens, including a holder, a base, a first elastic element, and a first biasing element. The optical lens is disposed in a receiving space of the holder. The base has a central axis, and the holder is movable relative to the base. The first elastic element is connected to the holder and the base. The first biasing element exerts a force on the holder so that an optical axis of the optical lens has an angular displacement relative to the central axis.

In some embodiments, the first biasing element is made of a shape-memory alloy material.

In some embodiments, the lens driving mechanism further comprises a conductor formed on the base by insert molding or 3D molded interconnect device technology, wherein the conductor is electrically connected to the first biasing element.

In some embodiments, the first biasing element has a first section and a U-shaped second section, and the first section is substantially parallel to the central axis and connects to the second section.

In some embodiments, the first biasing further has a third section substantially perpendicular to the central axis, and the second section connects to the first section and the third section.

In some embodiments, the second section and the third section are located on opposite sides of the first section.

In some embodiments, the base has a main body and at least one protrusion, the protrusion protrudes toward the holder from the main body, and the first elastic element connects to the protrusion and the holder.

In some embodiments, the lens driving mechanism further comprises a second biasing element and a plate, the second biasing element connects to the base and the plate, and the second biasing element forces the base and the holder to move relative to the plate.

In some embodiments, the second biasing element forces the base and the holder to move relative to the plate in a direction that is substantially perpendicular to the central axis.

In some embodiments, the second biasing element is made of a shape-memory alloy material.

In some embodiments, the first biasing element and the second biasing element are situated in different positions along the central axis.

In some embodiments, the lens driving mechanism further comprises a rolling element disposed between the base and the plate.

In some embodiments, the lens driving mechanism further comprises a second elastic element connected to the base and the plate.

In some embodiments, the lens driving mechanism further comprises an image sensor affixed to the base.

In some embodiments, the base is between the holder and the plate, and the image sensor is between the base and the plate.

An embodiment of the invention provides a method for controlling the lens driving mechanism, wherein the lens driving mechanism further comprises a plurality of first biasing elements disposed on different sides of the base, the method comprising: applying a plurality of driving signals to the respective first biasing elements to move the holder along the central axis relative to the base.

Another embodiment of the invention provides a method for controlling the lens driving mechanism, wherein the lens driving mechanism further comprises a plurality of first biasing elements disposed on different sides of the base, the method comprising: applying a plurality of driving signals to the respective first biasing elements so that the optical axis has an angular displacement relative to the central axis.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the lens driving mechanisms are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
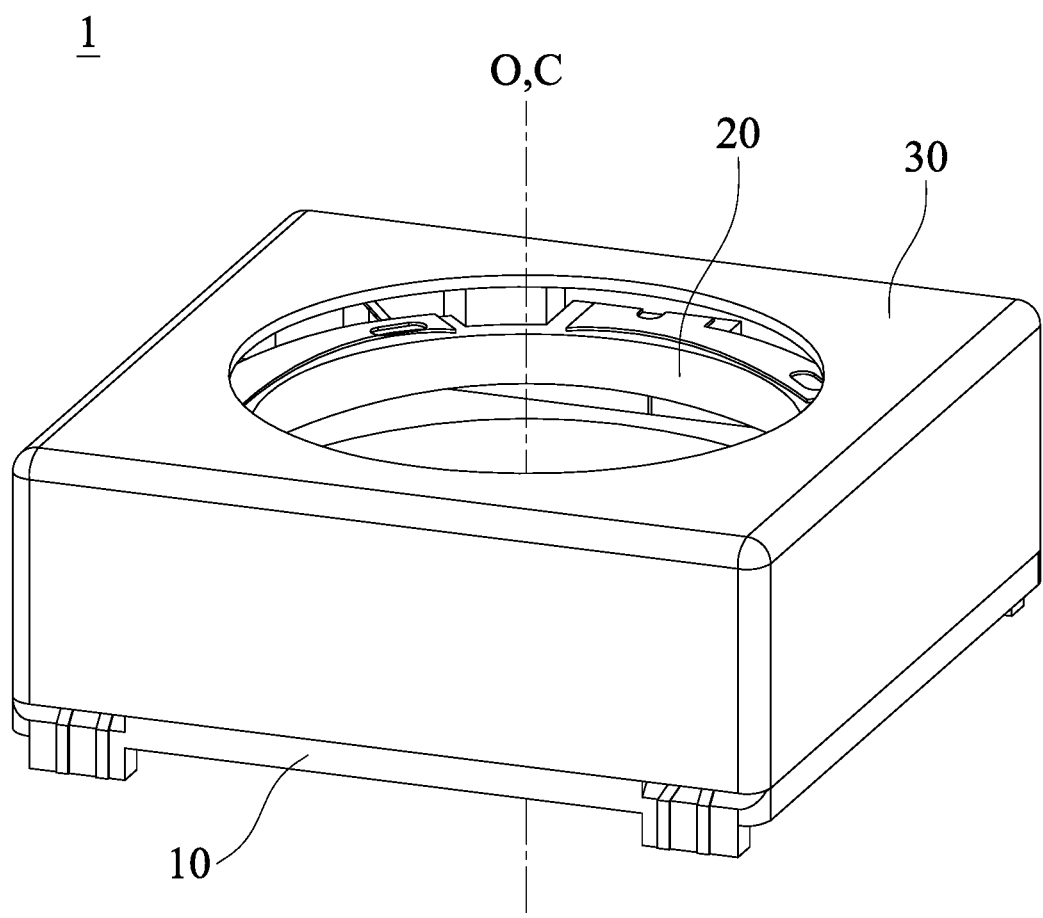
FIG. 1 is a schematic diagram of a lens driving mechanism according to an embodiment of the invention.
Figure 2:
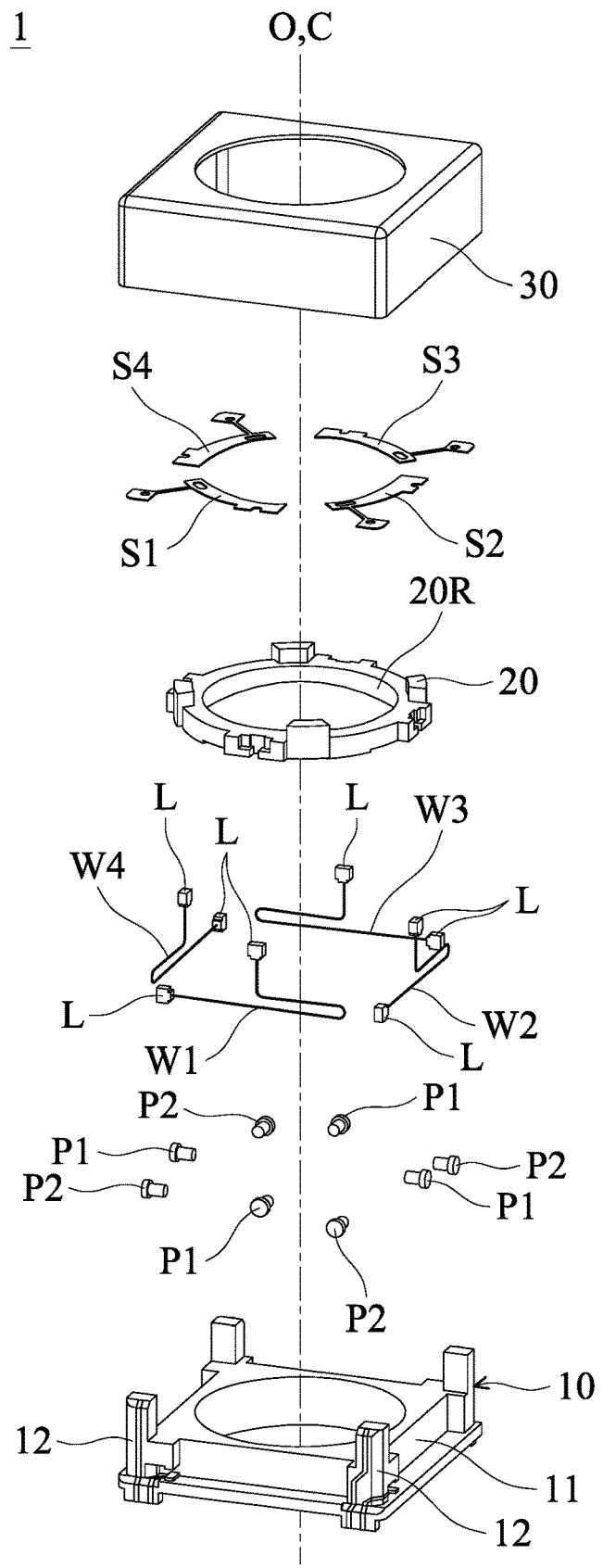
FIG. 2 is an exploded diagram of the lens driving mechanism in FIG. 1.

Referring to FIGS. 1-2, FIG. 1 is a schematic diagram of a lens driving mechanism 1 according to an embodiment of the invention, and FIG. 2 is an exploded diagram of the lens driving mechanism 1 in FIG. 1. The lens driving mechanism 1 can be disposed in an electronic device, such as a camera, a tablet computer, or a cell phone, and it can be configured with an optical lens (not shown) disposed therein. The optical lens is movable relative to an image sensor of the electronic device, so that the lens driving mechanism 1 has an auto-focusing function.

Figure 3:
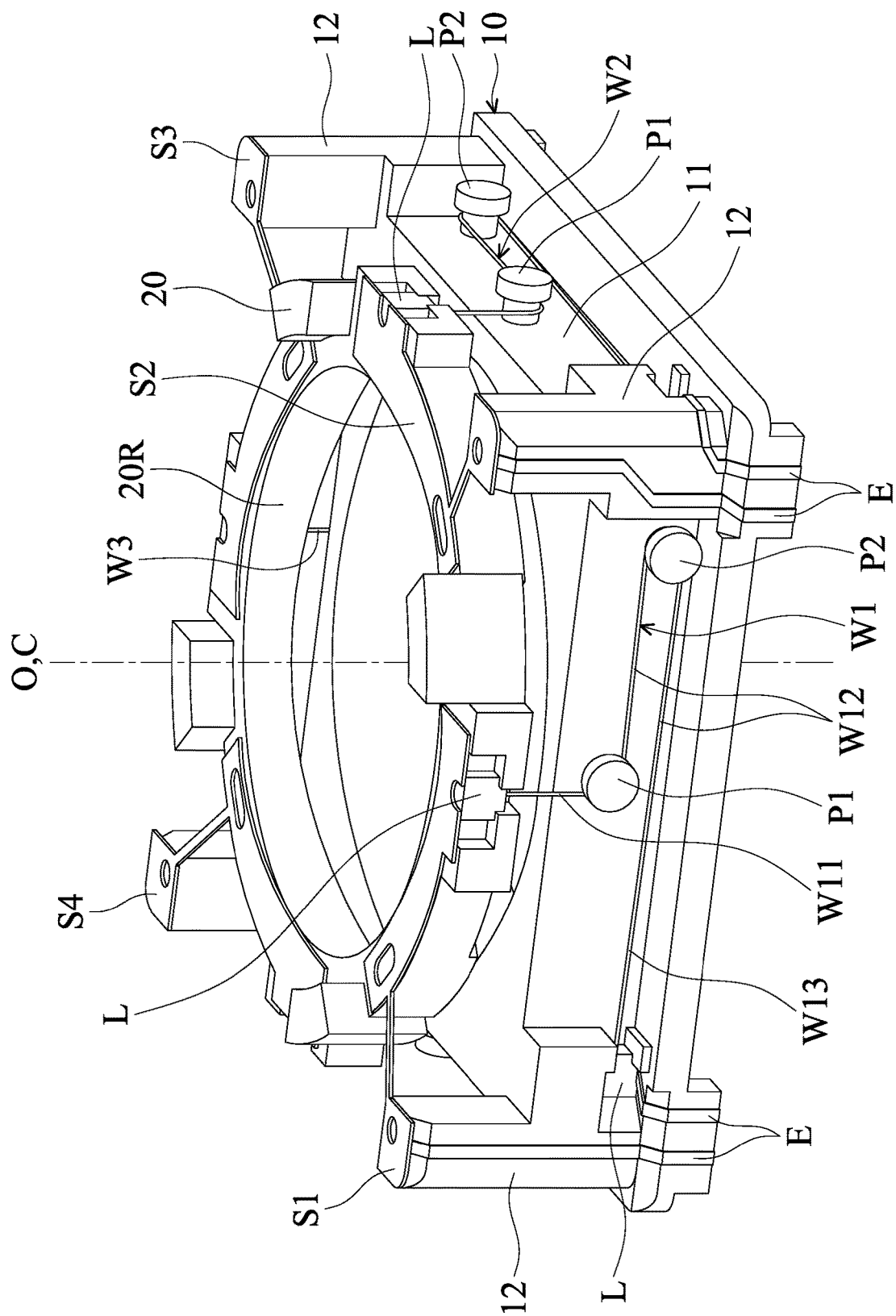
FIG. 3 is a schematic diagram of the lens driving mechanism with the housing in FIG. 1 omitted therefrom.

As shown in FIGS. 1-2, the lens driving mechanism 1 primarily comprises a base 10, a holder 20 made of an insulation material, a housing 30, a plurality of first elastic elements S1 to S4, a plurality of first biasing elements W1 to W4, and a plurality of positioning members P1 and P2. A receiving space 20R is extended through the holder 20, so that an optical lens (not shown) can be disposed therein. An image sensor (not shown) is disposed under the base 10 and configured to receive light from the outside of the lens driving mechanism 1 and through the optical lens. The base 10 has a central axis C which coincides with an optical axis O of the optical lens. The base 10 has a main body 11 formed as a square or rectangular structure and four protrusions 12. The protrusions 12 are respectively disposed at the four corners of the main body 11 and protrude from the main body 11 toward the holder 20. As shown in FIG. 3, the holder 20 is disposed on the base 10 and connects to the four protrusions 12 of the base 10 by the four first elastic elements S1 to S4 (such as metal springs).

The first biasing elements W1 to W4 connect to the base 10 and the holder 20. The first biasing elements W1 to W4 may be made of a shape-memory alloy (SMA) material, and their lengths can be changed by applying one or more driving signals (e.g., electrical current) to them from an external power source. For example, when applying a driving signal to heat the first biasing elements W1 to W4, the first biasing elements W1 to W4 are deformed (e.g., elongated or shortened). When the application of the driving signal is stopped, the deformed first biasing elements W1 to W4 will recover to their original lengths. In other words, by applying an appropriate driving signal, the lengths of the first biasing elements W1 to W4 can be controlled to alter the posture of the holder 20. The first biasing elements W1 to W4, for example, may be made of a titanium-nickel (TiNi) alloy, a titanium-palladium (TiPd) alloy, a titanium-nickel (TiNiCu) alloy, a titanium-nickel-palladium (TiNiPd) alloy, or a combination thereof.

Referring to FIGS. 2-3, FIG. 3 is a schematic diagram of the lens driving mechanism 1 in FIG. 1, in which the housing 30 is omitted. As described above, the holder 20 connects to the four protrusions 12 of the base 10 through the four first elastic elements S1 to S4, respectively, and the first biasing elements W1 to W4 are respectively disposed on the four different sides of the body 11 and connect to the holder 20 and the base 10. Specifically, the two ends of each of the first biasing elements W1 to W4 are electrically connected to two conductive blocks L, respectively, and the conductive blocks L are respectively affixed to the holder 20 and the base 10 (for example, they are affixed to the holder 20 and the base 10 by an engaging means or an adhesive). The first biasing elements W1 to W4 may be electrically connected to the corresponding first elastic elements S1 to S4 through the respective conductive blocks L.

Referring to FIG. 3, the lens driving mechanism 1 further comprises a plurality of electric conductors E (such as conductive wires) which are formed on the base 10 by insert molding or 3D molded interconnect device (MID) technology. The conductors E electrically connect to the first elastic elements S1 to S4 and the first biasing elements W1 to W4 to form four independent circuits, respectively, whereby driving signals (e.g., current) can be supplied to them from an external power source, and the lengths of the first biasing elements W1 to W4 can be changed to adjust the posture of the holder 20. It should be noted that, since the conductors E are formed on the base 10 by insert molding or 3D molded interconnect device technology, the number of components of the lens driving mechanism 1 can be reduced and the dimensions thereof can be greatly reduced. In addition, since the first elastic elements S1 to S4 are electrically conductive (such as springs made of metal), the first biasing elements W1 to W4 and the conductors E can be electrically connected to each other, so that no additional wires are required in the lens driving mechanism 1, saving space.

It should be understood that each of the first biasing elements W1 to W4 is electrically independent and connects to an external power source. Thus, a plurality of different driving signals can be respectively supplied to the first biasing elements W1 to W4 by the external power source, and the first biasing elements W1 to W4 can be independently controlled to have different or the same length variations. For example, when applying driving signals to the first biasing elements W1 to W4, the first biasing elements W1 to W4 are deformed, so that the first biasing elements W1 to W4 can force the holder 20 and the optical lens to move along the optical axis O relative to the base 10, or force the optical axis O to have an angular displacement relative to the central axis C of the base 10, to achieve the function of fast optical focus or optical image stabilization (OIS).

Still referring to FIG. 3, two columnar position members P1 and P2 are disposed on each side of the main body 11 of the base 10. The first biasing elements W1 to W4 are in contact with and extended around the position members P1 and P2. All the first biasing elements W1 to W4 can be divided into three sections: a first section W11, a second section W12, and a third section W13. The first section W11 is substantially parallel to the central axis C, and the second section W12 has a U-shaped structure and connects to the first section W11. The third section W13 is substantially perpendicular to the central axis C, wherein the second section W12 is connected to the first section W11 and the third section W13, and the second section W12 and the third section W13 are respectively located on the left and right sides of the first section W11. As the first biasing elements W1 to W4 extend around the position members P1 and P2 to form the three sections W11, W12, and W13, the lengths of the first biasing elements W1 to W4 disposed on each side of the main body 11 can be increased. Therefore, when the first biasing elements W1 to W4 are deformed, more variation in length can be generated. Furthermore, due to the distance between the position members P1 and P2 in the direction of the central axis C, short-circuits between the first, second, and third sections W11, W12, and W13 can be avoided.

Figure 4:
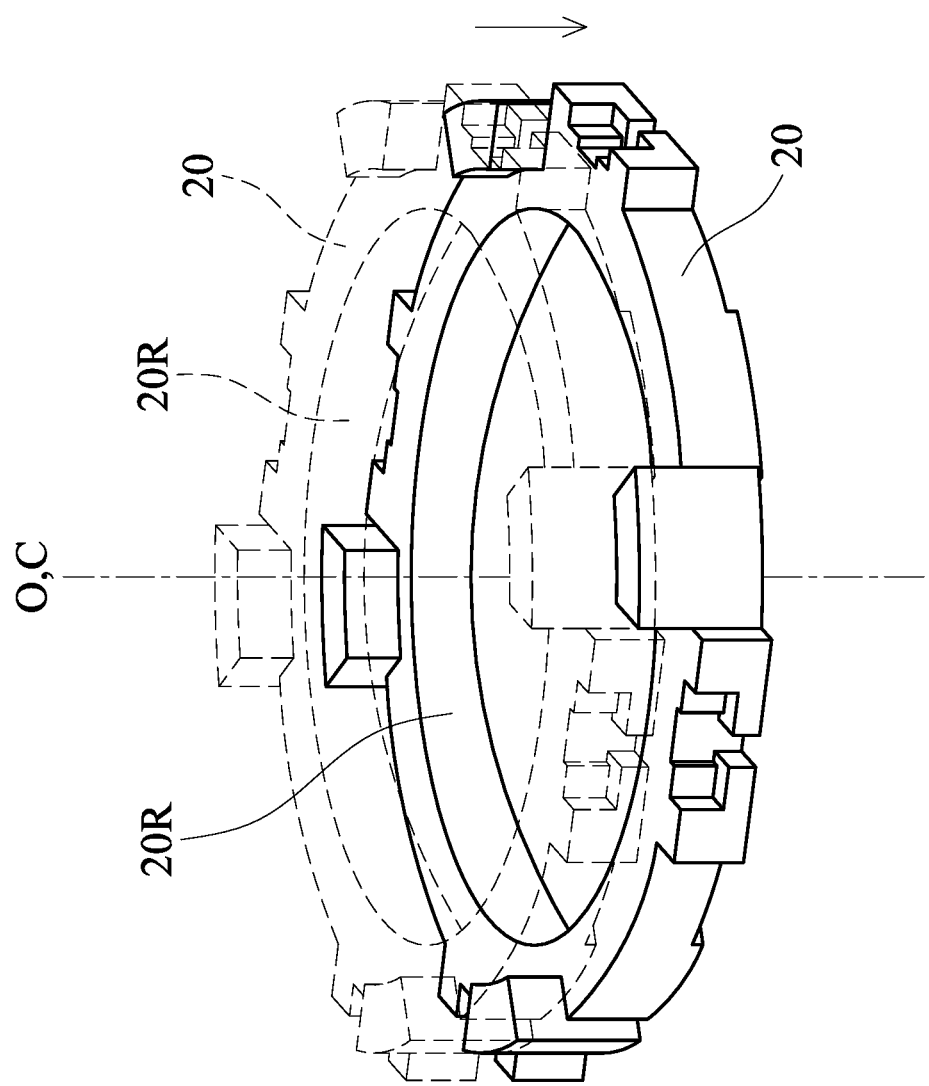
FIG. 4 is a schematic diagram of the holder moving in the direction of the optical axis.

How the holder 20 and the optical lens are moved relative to the base 10 by controlling the length variations of the first biasing elements W1 to W4 will be described in detail below. In the present embodiment, as shown in FIG. 4, when the driving signals are applied to the first biasing elements W1 to W4 on the four sides of the body 11, if the length variations thereof are substantially the same, the first biasing elements W1 to W4 can force the holder 20 and the optical lens to move relative to the base 10 in the direction of the optical axis O.

Figure 5:
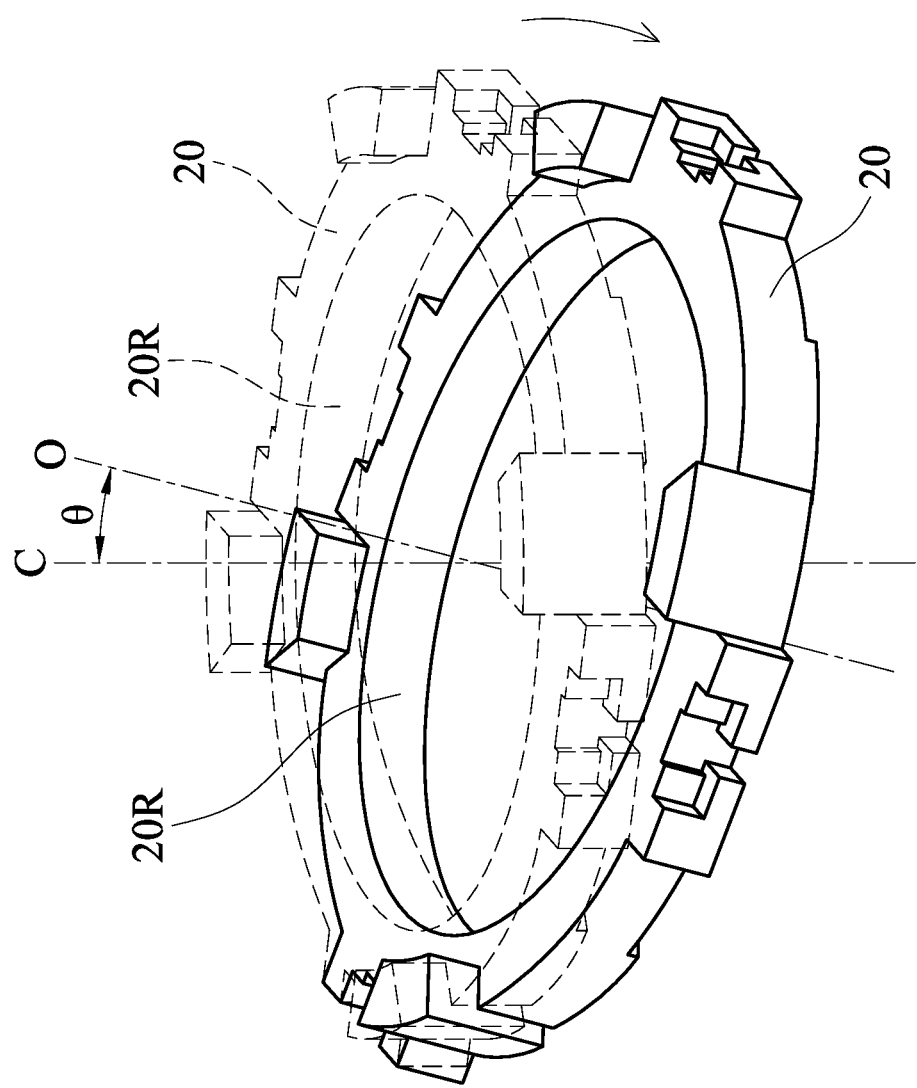
FIG. 5 is a schematic diagram of the optical axis having an angular displacement relative to the central axis.

On the other hand, when different driving signals are applied to the first biasing elements W1 to W4 and the length variations thereof are different from each other, the holder 20 and the optical axis O of the optical lens can have an angular displacement θ relative to the central axis C of the base 10 (as shown in FIG. 5).

That is, by independently applying different driving signals to the first biasing elements W1 to W4, the length variations thereof can respectively be controlled, so that the holder 20 and the optical lens can be moved relative to the base 10 along the optical axis O, or the optical axis O can have an angular displacement θ relative to the central axis C of the base 10, so as to facilitate auto-focusing and optical image stabilization of the lens driving mechanism 1. Furthermore, in another embodiment, the lens driving mechanism 1 may have only one first elastic element S1 and one first biasing element W1, to form a circuit loop with the conductor E and the external power source. When a driving signal is applied to the first biasing element W1, the first biasing element W1 is deformed, and the optical axis O can be angularly shifted by an angular displacement θ relative to the central axis C of the base 10, so that tilt angle compensation of the lens driving mechanism 1 can be accomplished.

According to the aforementioned embodiment, a control method of the lens driving mechanism 1 further is provided, comprising: applying a plurality of driving signals to the first biasing elements W1 to W4 such that the holder 20 and the optical lens move in the direction of the optical axis O. Alternatively, a plurality of driving signals may be applied to the first biasing elements W1 to W4 such that the optical axis O of the optical lens has an angular displacement θ relative to the central axis C of the base 10.

Figure 6:
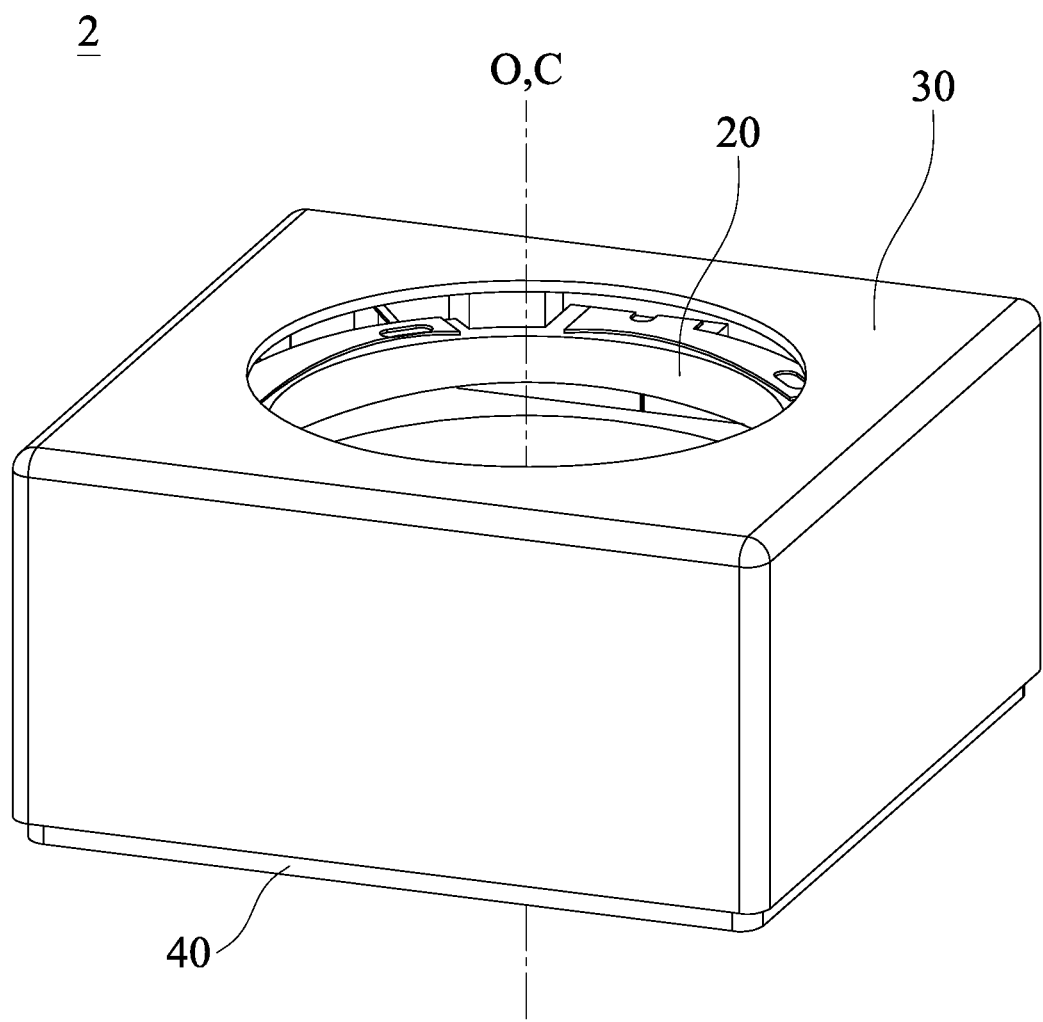
FIG. 6 is a schematic diagram of a lens driving mechanism according to another embodiment of the invention.
Figure 7:
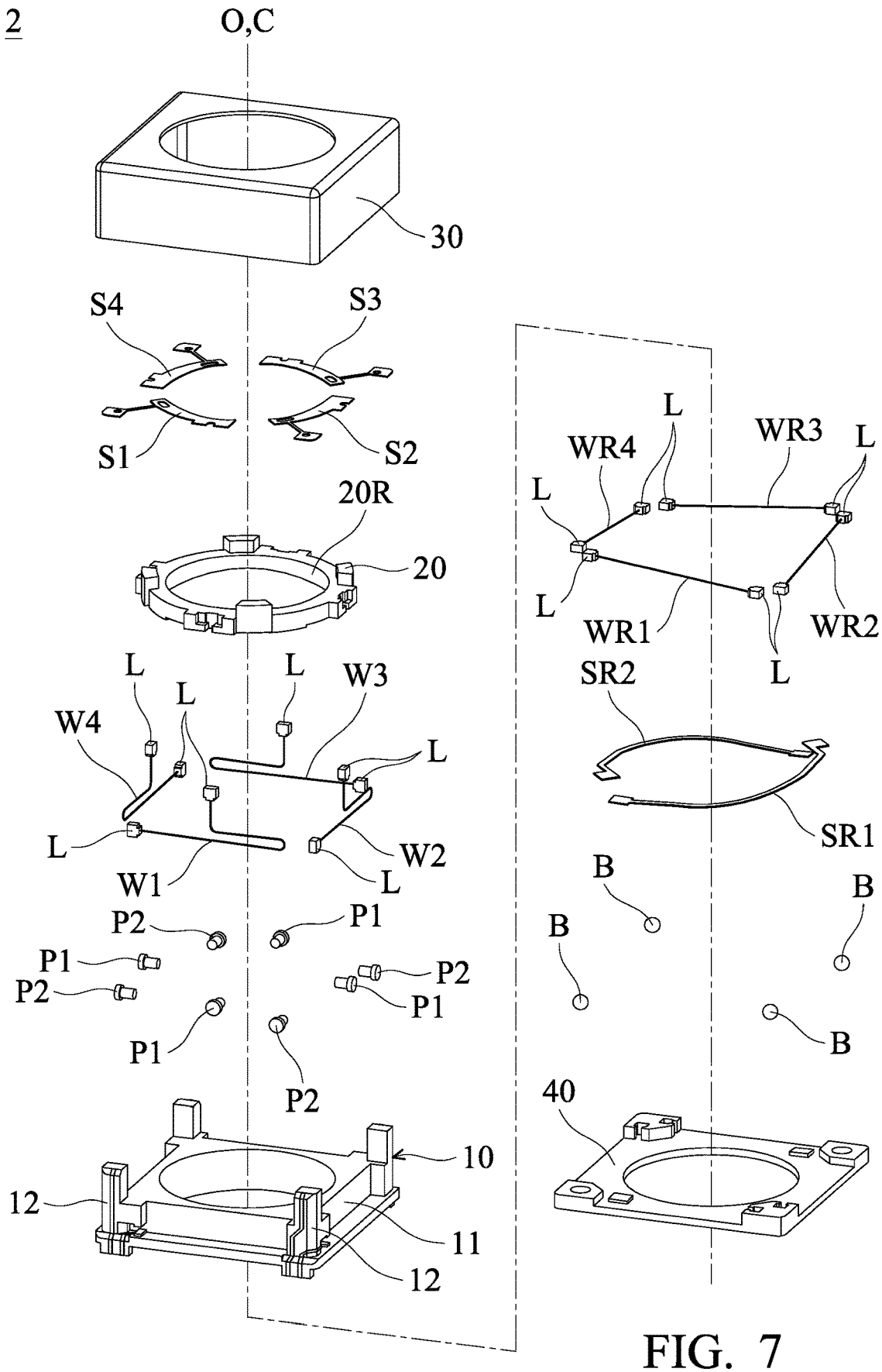
FIG. 7 is an exploded diagram of the lens driving mechanism in FIG. 6.

FIGS. 6-7 are schematic and exploded diagrams of a lens driving mechanism 2 according to another embodiment of the invention. The main difference between the lens driving mechanism 2 in the present embodiment and the lens driving mechanism 1 in the aforementioned embodiment is that the lens driving mechanism 2 further comprises a plate 40, a plurality of second elastic elements SR1 and SR2, a plurality of second biasing elements WR1 to WR4, and a plurality of rolling elements B, wherein the same elements corresponding to the aforementioned embodiment (FIGS. 1-5) are not described again here in detail.

Figure 8:
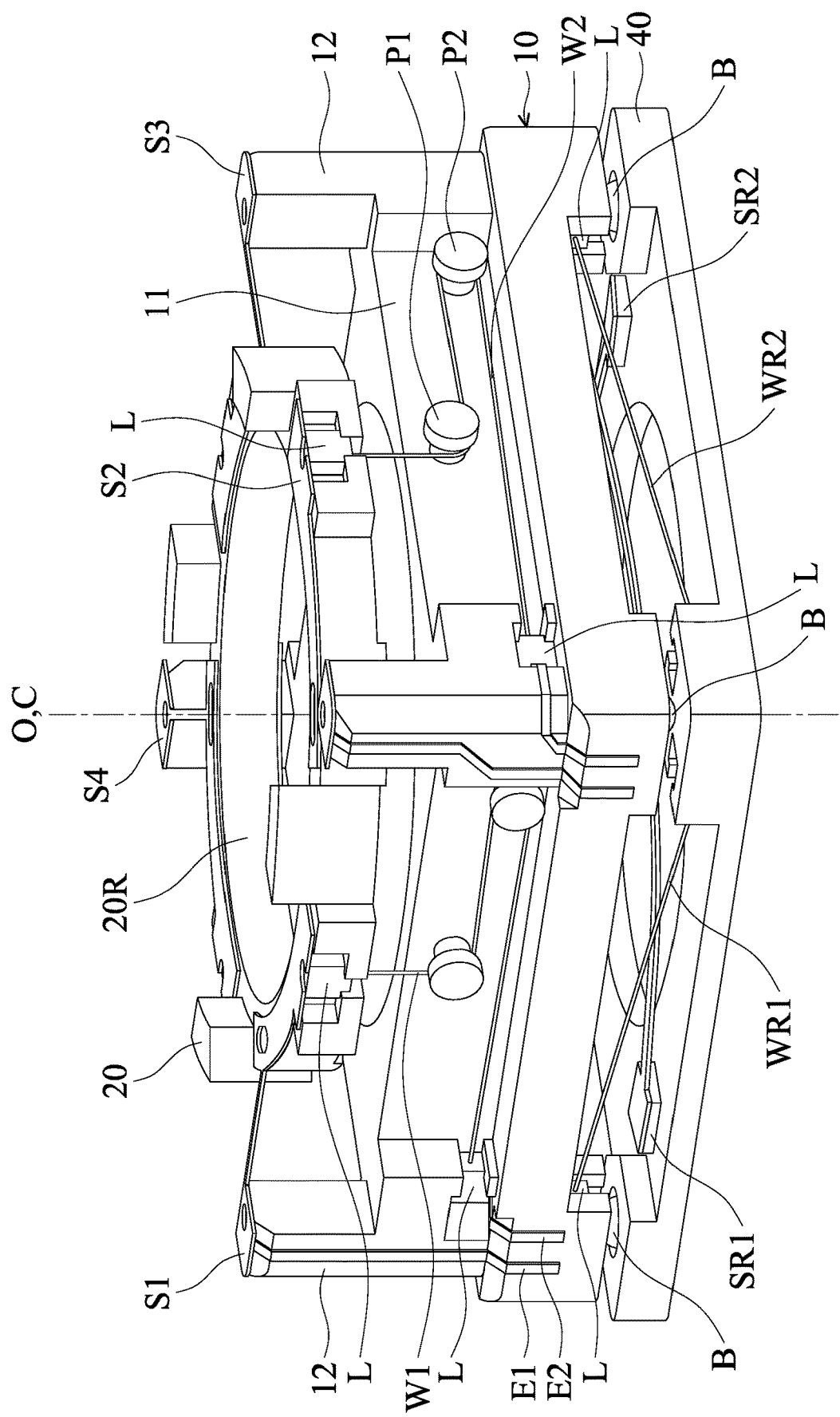
FIG. 8 is a schematic diagram of the lens driving mechanism with the housing in FIG. 6 omitted therefrom.
Figure 9:
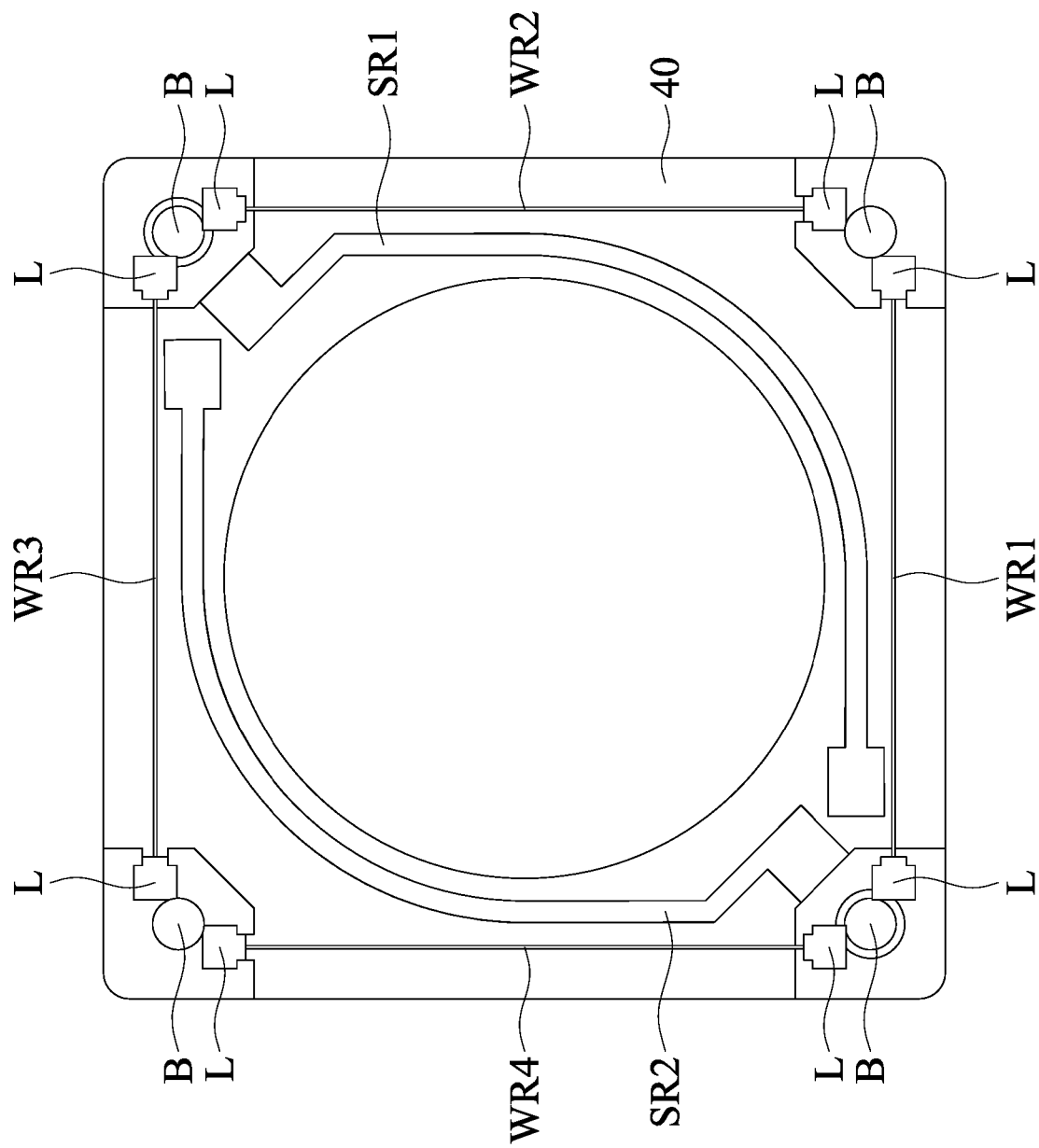
FIG. 9 is a top plan view of the plate, the second elastic elements, the second biasing elements, and the rolling elements in FIG. 8.

Referring to FIGS. 7-9, an image sensor (not shown) is disposed on the plate 40, the base 10 is disposed on the plate 40, and the second elastic elements SR1 and SR2 and the second biasing elements WR1 to WR4 are connected to the plate 40 and the base 10. Specifically, the two ends of the second elastic elements SR1 and SR2 connect to the plate 40 and the base 10, respectively, and the two ends of the second biasing elements WR1 to WR4 connect to the plate 40 and the base 10 via the conductive blocks L (as shown in FIGS. 8-9), wherein the second biasing elements WR1 to WR4 and the first biasing elements W1 to W4 are located in different positions in the direction of the central axis C conductors E. When an external power source applies different driving signals to the second biasing elements WR1 to WR4, the second biasing elements WR1 to WR4 can deform and force the base 10 and the holder 20 to move relative to the plate 40 in a direction that is substantially perpendicular to the central axis C. Therefore, the displacement between the optical axis O and the central axis C due to shaking of the lens driving mechanism 2 in the horizontal direction can be compensated for.

It should be noted that the rolling elements B of the lens driving mechanism 2, such as balls or rollers, are sandwiched between the plate 40 and the base 10. When the second biasing elements WR1 to WR4 are expanded or contracted to force the base 10 and the holder 20 to move relative to the plate 40, the base 10 and the holder 20 can be guided to move in the horizontal direction guided by the rolling elements B. Thus, damage to the mechanism due to contact between the plate 40 and the base 10 can be efficiently prevented.

Figure 10:
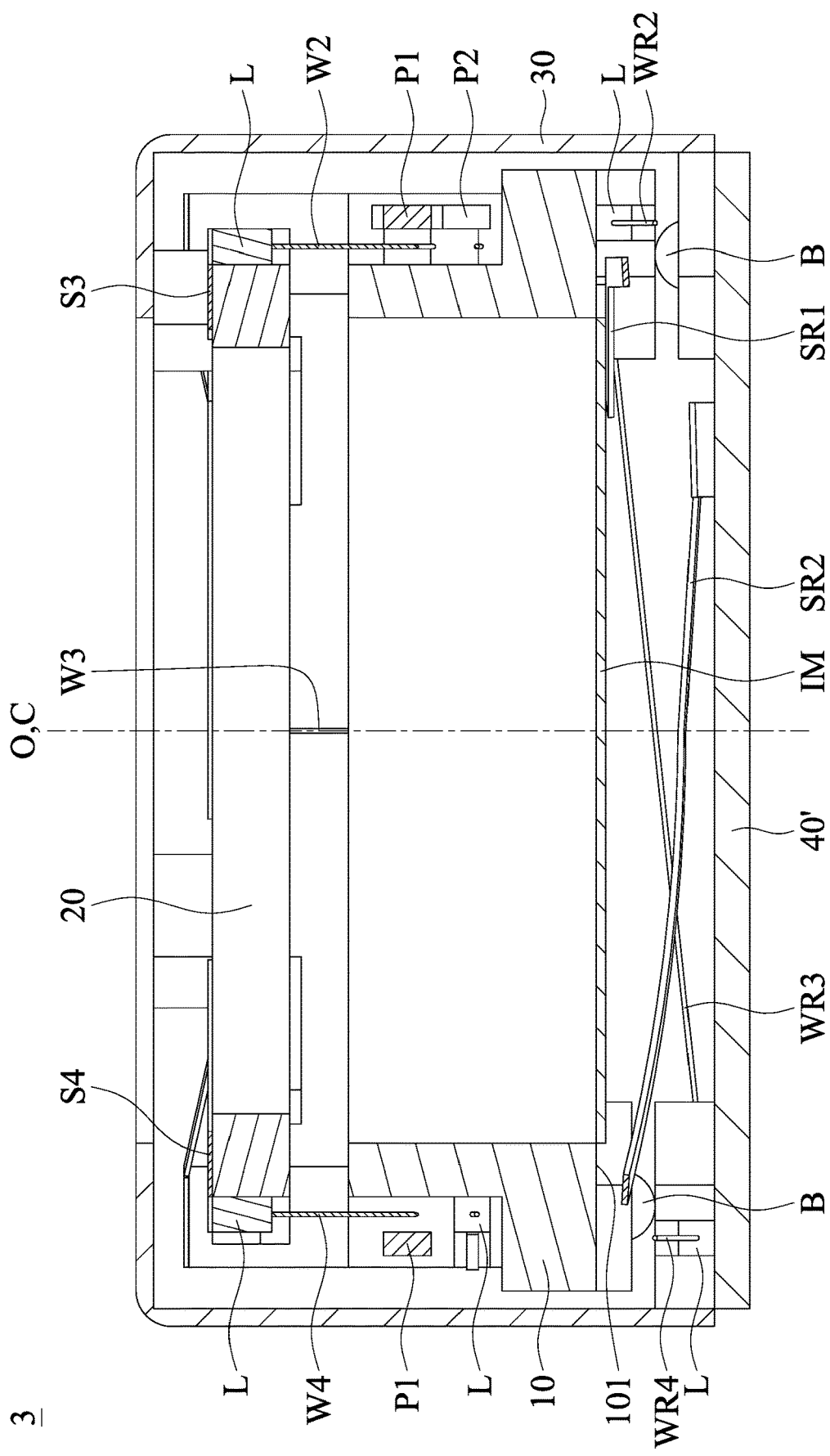
FIG. 10 is a schematic diagram of a lens driving mechanism according to another embodiment of the invention.

FIG. 10 is schematic diagram of a lens driving mechanism 3 according to another embodiment of the invention. The main difference between the lens driving mechanism 3 in the present embodiment and the lens driving mechanism 2 in the aforementioned embodiment is that the plate 40' in the lens driving mechanism 3 does not have any receiving space for receiving the image sensor. The plate 40' is affixed to a casing of an electronic device, and an image sensor IM is affixed to a rear surface 101 of the base 10. Here, the base 10 is between the holder 20 and the plate 40', and the image sensor IM is between the base 10 and the plate 40'. Thus, when the second biasing elements WR1 to WR4 deform, the second biasing elements WR1 to WR4 can force the base 10, the holder 20, and the image sensor IM to move together in a direction that is substantially perpendicular to the central axis C. In other words, the image sensor IM and the optical lens disposed in the holder 20 can move together relative to the plate 40', so that vibration compensation of the lens driving mechanism 2 can be achieved.

In summary, a lens driving mechanism and a control method thereof are provided. The lens driving mechanism is configured to drive an optical lens, primarily comprising a holder, a base, at least one first elastic element, and at least one first biasing element. The first elastic element connects to the holder and the base. The first biasing element also connects to the holder and the base. When the length variation of the first biasing element occurs, the holder and the optical lens will move or have an angular displacement relative to the central axis of the base. Therefore, the functions of optical focus or optical shaking compensation can be accomplished.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A driving mechanism, configured to drive an optical element, comprising:
   a movable portion, including:
   a base;
   a holder, configured to sustain the optical element having an optical axis, wherein the holder is movable relative to the base; and
   a driving assembly, configured to drive the holder to move relative to the base along the optical axis;
   a fixed portion, wherein the movable portion is movable relative to the fixed portion;
   a biasing driving assembly, configured to move the movable portion and the fixed portion relative to each other in a direction that is perpendicular to the optical axis, wherein the biasing driving assembly has a plurality of elongated biasing elements located on an edge area of the fixed portion when viewed from the optical axis;
   a plurality of first elastic elements, connecting the holder and the base; and
   a plurality of second elastic elements, connecting the base and the fixed portion;
   wherein the second elastic elements are disposed between the base and the fixed portion, and the second elastic elements are closer to the optical axis than the biasing elements.

2. The driving mechanism as claimed in claim 1, wherein the first elastic elements are electrically independent from each other, and the driving assembly is electrically connected to the first elastic elements.

3. The driving mechanism as claimed in claim 2, further comprising a conductor, wherein at least a portion of the conductor is disposed on the base, and the first elastic elements, the driving assembly and the biasing driving assembly are electrically connected to the conductor.

4. The driving mechanism as claimed in claim 3, wherein the driving assembly at least partially overlaps the conductor when viewed from a direction that is perpendicular to the optical axis.

5. The driving mechanism as claimed in claim 3, wherein the first elastic elements are located on a side of the holder which is away from the base, and the driving assembly is in direct contact with the first elastic elements.

6. The driving mechanism as claimed in claim 2, wherein the first elastic elements are rotationally symmetrical about the optical axis.

7. The driving mechanism as claimed in claim 2, wherein the movable portion is elastically connected the fixed portion via at least one of the second elastic elements.

8. The driving mechanism as claimed in claim 7, wherein the second elastic elements at least partially overlaps the biasing driving assembly when viewed from a direction that is perpendicular to the optical axis.

9. The driving mechanism as claimed in claim 1, wherein the driving assembly and the biasing driving assembly are disposed at different positions in a direction of optical axis.

10. The driving mechanism as claimed in claim 1, wherein the driving assembly does not overlap the biasing driving assembly when viewed from a direction that is perpendicular to the optical axis.

11. The driving mechanism as claimed in claim 1, wherein the biasing driving assembly is configured to drive the holder and the optical element to move, wherein the optical axis of the optical element has an angular displacement relative to a central axis of the base.

12. The driving mechanism as claimed in claim 1, wherein the biasing driving assembly has a shape-memory alloy material.

13. The driving mechanism as claimed in claim 1, further comprising an image sensor disposed on the base, wherein the biasing driving assembly is configured to drive the base and the image sensor to move relative to the fixed portion.

14. The driving mechanism claim 13, wherein the image sensor is disposed on a rear surface of the base which is adjacent to the fixed portion.

15. The driving mechanism as claimed in claim 1, wherein the second elastic elements extend upwardly to connect the base from the fixed portion.

16. The driving mechanism as claimed in claim 15, wherein each second elastic element has an elongated curved portion that extends from a corner area of the fixed portion to a corner area of the base.

17. The driving mechanism as claimed in claim 16, wherein the corner area of the fixed portion and the corner area of the base are diagonally opposite on a horizontal plane when viewed from the optical axis.

18. The driving mechanism as claimed in claim 1, further comprising a rolling assembly disposed between the base and the fixed portion, and the rolling assembly is configured to guide the movable portion to move in a direction that is perpendicular to the optical axis when the movable portion is driven via the biasing driving assembly.

* * * * *